(12) United States Patent
Whang et al.

(10) Patent No.: US 7,792,840 B2
(45) Date of Patent: Sep. 7, 2010

(54) TWO-LEVEL N-GRAM INDEX STRUCTURE AND METHODS OF INDEX BUILDING, QUERY PROCESSING AND INDEX DERIVATION

(75) Inventors: Kyu-Young Whang, Daejon (KR); Min-Soo Kim, Daejeon (KR); Jae-Gil Lee, Daejon (KR); Min-Jae Lee, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 381 days.

(21) Appl. No.: 11/501,265

(22) Filed: Aug. 9, 2006

(65) Prior Publication Data
US 2007/0050384 A1    Mar. 1, 2007

(30) Foreign Application Priority Data
Aug. 26, 2005    (KR) ...................... 10-2005-0078687

(51) Int. Cl.
*G06F 7/00* (2006.01)
*G06F 17/30* (2006.01)

(52) U.S. Cl. ...................................... 707/742; 707/808
(58) Field of Classification Search ................. 707/100, 707/742, 808; 704/7
See application file for complete search history.

(56) References Cited

U.S. PATENT DOCUMENTS

| | | | | |
|---|---|---|---|---|
| 6,161,082 A | * | 12/2000 | Goldberg et al. ............... | 704/3 |
| 6,349,308 B1 | * | 2/2002 | Whang et al. ............ | 707/103 Z |
| 2006/0116997 A1 | * | 6/2006 | Yu et al. ........................ | 707/4 |

OTHER PUBLICATIONS

Ricardo Baeza-Yates and Berthier Ribeiro-Neto, Modern Information Retrieval, ACM Press, 1999.

Falk Scholer, Hugh E. Williams, John Yiannis and Justin Zobel, "Compression of Inverted Indexes for Fast Query Evaluation", In Proc. Int'l Conf. On Information Retrieval, ACM SIGIR, Tampere, Finland, pp. 222-229, Aug. 2002.

Ethan Miller, Dan Shen, Junli Liu and Charles Nicholas, Performance and Scalability of a Large-Scale N-gram Based Information Retrieval System, Journal of Digital Information 1(5), pp. 1-25, Jan. 2000.

James Mayfield and Paul McNamee, Single N-gram Stemming, in Proc. Int'l Conf. On Information Retrieval, ACM SIGIR, Toronto, Canada, pp. 415-416, Jul./Aug./ 2003.

* cited by examiner

*Primary Examiner*—James Trujillo
*Assistant Examiner*—Amresh Singh
(74) *Attorney, Agent, or Firm*—Bachman & LaPointe, P.C.

(57) ABSTRACT

Disclosed relates to a structure of two-level n-gram inverted index and methods of building the same, processing queries and deriving the index that reduce the size of n-gram inverted index and improves the query performance by eliminating the redundancy of the position information that exists in the n-gram inverted index.

The inverted index of the present invention comprises a back-end inverted index using subsequences extracted from documents as a term and a front-end inverted index using n-grams extracted from the subsequences as a term. The back-end inverted index uses the subsequences of a specific length extracted from the documents to be overlapped with each other by n−1 (n: the length of n-gram) as a term and stores position information of the subsequences occurring in the documents in a posting list for the respective subsequences. The front-end inverted index uses the n-grams of a specific length extracted from the subsequences using a 1-sliding technique as a term and stores position information of the n-grams occurring in the subsequences in a posting list for the respective n-grams.

1 Claim, 13 Drawing Sheets

$d$: Document identifier
$o_i$: Offset where term $t$ occurs in a document $d$
$f$: Frequency of occurrence of term $t$ in a document $d$

| | |
|---|---|
| Document 0 | A B C D D A B B C D ... |
| Document 1 | D A B C D A B C D A |
| Document 2 | C D A B B C D D A B |
| Document 3 | B C D A B C D A B C |
| Document 4 | D D A B C D A B C D |
| Document 5 | B B C D A B C D A B |

Fig. 13

| S | N | $O_1$ |
|---|---|---|
| 0 | AB | 0 |
| 3 | AB | 2 |
| 4 | AB | 1 |
| 5 | AB | 2 |
| 1 | BB | 0 |
| 0 | BC | 1 |
| 1 | BC | 1 |
| 2 | BC | 0 |
| 4 | BC | 2 |
| 0 | CD | 2 |
| 1 | CD | 2 |
| 2 | CD | 1 |
| 3 | CD | 0 |
| 2 | DA | 2 |
| 3 | DA | 1 |
| 4 | DA | 0 |
| 5 | DA | 1 |
| 5 | AB | 0 |

$SNO_1$ Relation

| S | D | $O_2$ |
|---|---|---|
| ABCD (0) | 0 | 0 |
| ABCD (0) | 3 | 3 |
| ABCD (0) | 4 | 6 |
| BBCD (1) | 0 | 6 |
| BBCD (1) | 2 | 3 |
| BBCD (1) | 5 | 0 |
| BCDA (2) | 1 | 6 |
| BCDA (2) | 3 | 0 |
| BCDA (2) | 4 | 3 |
| CDAB (3) | 1 | 3 |
| CDAB (3) | 2 | 0 |
| CDAB (3) | 5 | 6 |
| DABC (4) | 1 | 0 |
| DABC (4) | 3 | 6 |
| DABC (4) | 5 | 3 |
| DDAB (5) | 0 | 3 |
| DDAB (5) | 2 | 6 |
| DDAB (5) | 4 | 0 |

$SDO_2$ Relation 2-gram | Posting lists

| 2-gram | | | | |
|---|---|---|---|---|
| AB | 0,[0] | 3,[2] | 4,[1] | 5,[2] |
| BB | 1,[0] | | | |
| BC | 0,[1] | 1,[1] | 2,[0] | 4,[2] |
| CD | 0,[2] | 1,[2] | 2,[1] | 3,[0] |
| DA | 2,[2] | 3,[1] | 4,[0] | 5,[1] |
| DD | 5,[0] | | | |

Front-end inverted index in Fig. 7

4-subsequences Posting lists

| 4-subsequences | | | | |
|---|---|---|---|---|
| ABCD | 0,[0] | 3,[3] | 4,[6] | |
| BBCD | 0,[6] | 2,[3] | 5,[0] | |
| BCDA | 1,[6] | 3,[0] | 4,[3] | |
| CDAB | 1,[3] | 2,[0] | 5,[6] | |
| DABC | 1,[0] | 3,[6] | 5,[3] | |
| DDAB | 0,[3] | 2,[6] | 4,[0] | |

Back-end inverted index in Fig. 7

TWO-LEVEL N-GRAM INDEX STRUCTURE AND METHODS OF INDEX BUILDING, QUERY PROCESSING AND INDEX DERIVATION

BACKGROUND OF THE INVENTION

1. Field of the Invention

The present invention relates to an inverted index structure and a method of building the same and, more particularly, to a structure of two-level n-gram inverted index (simply referred to as n-gram/2L index) and methods of building the same, processing queries and deriving the index that reduce the size of n-gram index and improves the query performance by eliminating the redundancy of the position information that exists in the n-gram inverted index (simply referred to as n-gram index).

2. Description of Related Art

Searching text data is a very fundamental and important operation and is widely used in many areas such as an information retrieval and a similar sequence matching for DNA and protein databases. DNA and protein sequences are regarded as text data over specific alphabets, e.g. A, C, G and T in DNA. A variety of index structures have been studied aimed at efficiently processing the searching operations for text data, and an inverted index is the most practical index structure widely used (Ricardo Baeza-Yates and Berthier Ribeiro-Neto, Modern Information Retrieval, ACM Press, 1999).

The inverted index is a term-oriented mechanism for quickly searching documents containing terms given as a query. Here, the document is a defined sequence of characters and the term is a subsequence of the document. The inverted index fundamentally consists of terms and posting lists (Falk Scholer, Hugh E. Williams, John Yiannis and Justin Zobel, "Compression of Inverted Indexes for Fast Query Evaluation", In Proc. Int'l Conf. On Information Retrieval, ACM SIGIR, Tampere, Finland, pp. 222~229, August 2002).

A posting list is related to a specific term. A document identifier, which contains the term, and position information, where the corresponding term occurs, are managed as a list structure. Here, the document identifier and the position information are collectively referred to as a posting.

For each term of t, there is a posting list that contains postings $<d, [o_1, \ldots, o_f]>$, wherein d denotes a document identifier, $[o_1, \ldots, o_f]$ is a list of offsets o, and f represents the frequency of occurrence of the term t in the document (Falk Scholer, Hugh E. Williams, John Yiannis and Justin Zobel, "Compression of Inverted Indexes for Fast Query Evaluation", In Proc. Int'l Conf. on Information Retrieval, ACM SIGIR, Tampere, Finland, pp. 222-229, August 2002).

The postings in the posting list are usually stored in the order that the document identifiers d increase and the offsets in the posting are stored in the order that the offsets o increase in order to facilitate the query process. Besides, an index such as the B+-tree is created on the terms in order to quickly locate the posting list. FIG. 1 shows a structure of the inverted index.

The inverted index is classified into a word-based inverted index using a word as a term and an n-gram index (simply referred to as n-gram index) using an n-gram as a term according to the kind of terms (Ethan Miller, Dan Shen, Junli Liu and Charles Nicholas, Performance and Scalability of a Large-Scale N-gram Based Information Retrieval System, Journal of Digital Information 1(5), pp. 1~25, January 2000).

The n-gram index is an inverted index by extracting n-grams as indexing terms. An n-gram is a string composed of n consecutive characters extracted from d, when a document d is given as a sequence of characters $c_0, c_1, \ldots, c_{N-1}$.

Extracting all n-grams from the given document d in order to build an n-gram index can be done via a 1-sliding technique, i.e., sliding a window composed of n consecutive characters from $c_0$ to $c_{N-n}$ and storing the characters located in the window. Accordingly, the $i^{th}$ n-gram extracted from d is the string of $c_i, c_{i+1}, \ldots, c_{i+n-1}$.

FIG. 2 is an example of an n-gram index created from a set of given documents, wherein n=2. FIG. 2A shows the set of documents and FIG. 2B shows the n-gram index created on the documents.

Processing a query using the n-gram index is carried out in two steps: (1) splitting a given query string into multiple n-grams and searching posting lists of those n-grams; and (2) mergeing the posting lists (Ricardo Baeza-Yates and Berthier Ribeiro-Neto, Modern Information Retrieval, ACM Press, 1999).

For example, a query for searching documents containing a string of "BCDD" in the n-gram index in FIG. 2 includes the following two steps.

In the first step, the query "BCDD" is split into three 2-grams "BC", "CD" and "DD" and the respective 2-grams are searched in the inverted index.

In the second step, the posting lists corresponding to the respective 2-grams are merge-joined with the document identifiers and the documents where the three 2-grams "BC", "CD" and "DD" occur consecutively to constitute "BCDD" are searched. Since the three 2-grams occur consecutively in the documents 0 and 2 in the scanned posting lists, the query result is the document identifiers 0 and 2.

The n-gram index has language-neutral and error-tolerant advantages (Ethan Miller, Dan Shen, Junli Liu and Charles Nicholas, Performance and Scalability of a Large-Scale N-gram Based Information Retrieval System, Journal of Digital Information 1(5), pp. 1~25, January 2000).

The language-neutral advantage means that it does not need linguistic knowledge since the index terms are extracted in a mechanical manner.

For such characteristics, the n-gram index has been widely used for Asian languages, where complicated linguistic knowledge is required, or for DNA and protein databases, where the concepts of words are not definite.

The error-tolerant advantage denotes that it can retrieve documents even though the documents have some errors, e.g., typos or miss-recognition by the OCR software since the n-grams are extracted in the 1-sliding technique.

Accordingly, the n-gram index has been effectively used for the applications to searching documents that allow errors such as an approximate string matching.

Nevertheless, the n-gram index has also some drawbacks in that the size of the index becomes large and the process of queries requires a long time (James Mayfield and Paul McNamee, Single N-gram Stemming, In Proc. Int'l Conf. On Information Retrieval, ACM SIGIR, Toronto, Canada, pp. 415~416, July/August 2003).

These drawbacks result from the characteristics of the method of extracting terms, i.e., the 1-sliding technique.

The 1-sliding technique drastically increases the number of n-grams extracted, thus increasing the size of the n-gram index.

Moreover, it has a drawback in that it takes a long time to process queries, since the number of the postings to access during the query processing increases.

SUMMARY OF THE INVENTION

To overcome such drawbacks, the present invention provide an n-gram/2L index and methods of building the same, processing queries and deriving the index that reduce the size of n-gram index and improves the query performance by eliminating the redundancy of the position information that exists in the n-gram index.

An object of the present invention is to provide an n-gram/2L index structure comprising a back-end inverted index using subsequences extracted from documents as a term, and a front-end inverted index using n-grams extracted from the subsequences as a term.

The back-end inverted index uses the subsequences of a specific length extracted from the documents to be overlapped with each other by n−1 (n: the length of n-gram) as a term and stores position information of the subsequences occurring in the documents in a posting list for the respective subsequences.

The front-end inverted index uses the n-grams of a specific length extracted from the subsequences using a 1-sliding technique as a term and stores position information of the n-grams occurring in the subsequences in a posting list for the respective n-grams.

Another object of the present invention is to provide a method of building an n-gram/2L index comprising: a first step of extracting m-subsequences having a length of m from documents in a database to be overlapped with each other by a fixed portion and storing position information of the m-subsequences occurring in the documents; a second step of building a back-end inverted index for the respective position information stored in the first step, if a specific m-subsequence appears at an offset in a document, by appending a corresponding posting to a posting list for a term of the back-end inverted index corresponding to the specific m-subsequence; a third step of extracting n-grams from the respective m-subsequences of a set of the m-subsequences obtained in the first step and storing the position information of the n-grams occurring in the m-subsequence; and a fourth step of building a front-end inverted index for the respective position information stored in the third step, if a specific n-gram appears at an offset in a m-subsequence, by appending a corresponding posting to a posting list for a term of the front-end inverted index corresponding to the specific n-gram.

In the first step above, the m-subsequences are extracted to be overlapped with each other by n−1, the n depicting the length of the n-grams and, if the length of the last m-subsequence is less than m, blank characters are appended to the end of a string of characters so that the length becomes m.

Still another object of the present invention is to provide a method of processing queries using an n-gram/2L index, in the method of processing queries using a back-end inverted index using subsequences extracted from documents as a term and a front-end inverted index using n-grams extracted from the subsequences as a term, the method comprising: a first step of splitting a specific query into a plurality of n-grams; a second step of performing a merge-outer-join among posting lists for the respective n-grams obtained in the first step with m-subsequence identifier using the front-end inverted index and adding the m-subsequences covering the query to a specific set; and a third step of performing a merge-outer-join among posting lists for the respective m-subsequences contained in the specific set obtained in the second step with document identifier using the back-end inverted index, examining whether or not the set of m-subsequences extracted from the same documents contains the query and returning the same documents as a query result, if the set of m-subsequences contains the query.

The m-subsequences are checked whether or not they cover the query using offset information in the postings to be merge-outer-joined and the set of m-subsequences in the third step is checked whether or not it contains the query using offset information in the postings to be merge-outer-joined.

A further object of the present invention is to provide a method of deriving an n-gram/2L index, in a method of deriving an inverted index comprising a front-end inverted index and a back-end inverted index from an n-gram inverted index, the method comprising: a first step of converting the n-gram inverted index into a relation that obeys a first normal form (1NF); a second step of identifying whether or not a redundancy of position information, caused by a non-trivial multivalued dependency (MVD), exists in the relation obtained in the first step; a third step of decomposing the relation obtained in the first step into two relations to obey a fourth normal form (4NF) in order to eliminate the redundancy identified in the second step; and a fourth step of converting the two relation obtained in the third step into the front-end inverted index and the back-end inverted index, respectively.

BRIEF DESCRIPTION OF THE DRAWINGS

The above and other objects, features and advantages of the present invention will be more clearly understood from the following detailed description taken in conjunction with the accompanying drawings, in which:

FIG. 13 shows an example of a result that the relation $SNDO_1O_2$ is decomposed into two relations.

DETAILED DESCRIPTION OF THE INVENTION

Hereinafter, a detail description of the present invention will be given with reference to the attached drawings. The present invention is not restricted to the following embodiments, and many variations are possible within the spirit and scope of the present invention. The embodiments of the present invention are provided in order to more completely explain the present invention to anyone skilled in the art.

The present invention will now analyze the factors that the size of an n-gram index becomes large, identify that the major factors results from the redundancies in the position information and explain how to eliminate the redundancies.

Figure 3:
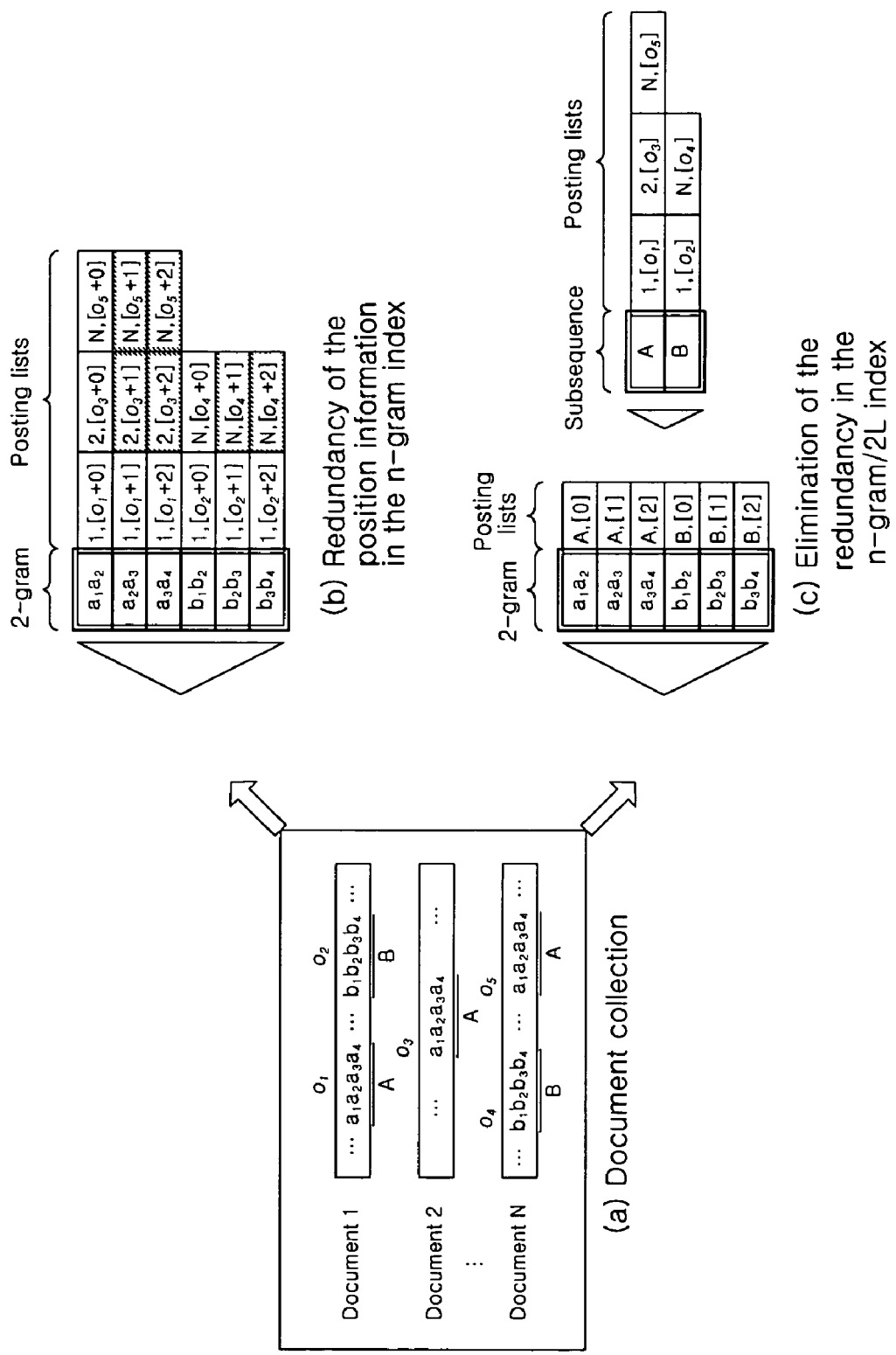
FIG. 3 depicts an example of redundancies of position information in the n-gram index and a method of eliminating the redundancies.

FIG. 3 depicts an example of redundancies of position information in the n-gram index and a method of eliminating the redundancies, i.e., a two-level n-gram index, (hereinafter, referred to as n-gram/2L).

In the figure, a set of documents (A) is an example consisting of N documents. If a string of characters "$a_1a_2a_3a_4$" is called a subsequence A, the subsequence A occurs at offsets $o_1$, $o_3$ and $o_5$ in the documents 1, 2 and N. if a string of characters "$b_1b_2b_3b_4$" is called a subsequence B, the subsequence B occurs at offsets $o_2$ and $o_4$ in the documents 1 and N.

Accordingly, three consecutive 2-grams "$a_1a_2$", "$a_2a_3$" and "$a_3a_4$" occur in the documents 1, 2 and N, and other three consecutive 2-grams "$b_1b_2$", "$b_2b_3$" and "$b_3b_4$" appear in the documents 1 and N.

FIG. 3B shows an n-gram index built from the set of documents in FIG. 3A. In FIG. 3B, the postings shaded have the redundancies in the position information.

That is, in the posting lists "$a_1a_2$", "$a_2a_3$" and "$a_3a_4$" of the 2-gram inverted index in FIG. 3B, the fact that the offsets of "$a_2a_3$" and "$a_3a_4$" are larger 1 and 2, respectively, than that of "$a_1a_2$" is repeatedly shown in the documents 2 and N, besides in the document 1.

Such repetition also appears in the posting lists of the 2-grams "$b_1b_2$", "$b_2b_3$" and "$b_3b_4$".

That is, if a subsequence is repeated frequently in documents, the relative offsets of the n-grams extracted from the corresponding subsequence would also be indexed repeatedly.

If the relative offsets of n-grams extracted from a subsequence that is frequently shown could be indexed only once, the index size would be reduced by eliminating such redundancies.

FIG. 3C shows an n-gram/2L index created from the documents in FIG. 3A. The position information of three 2-grams "$a_1a_2$", "$a_2a_3$" and "$a_3a_4$" can be represented in two levels as follows. The first level becomes the offsets of the subsequence A in the document as shown in the right part of FIG. 3C; and the second level becomes the offset of the 2-grams "$a_1a_2$", "$a_2a_3$" and "$a_3a_4$" in the subsequence A as shown in the left part of FIG. 3C, thus eliminating the redundancies of the position information.

Like this, decomposing the n-gram index into two inverted indexes (n-gram/2L indexes) is theoretically identical to the relational normalization process that removes the redundancy caused by a non-trivial multivalued dependency (MVD).

Figure 4:
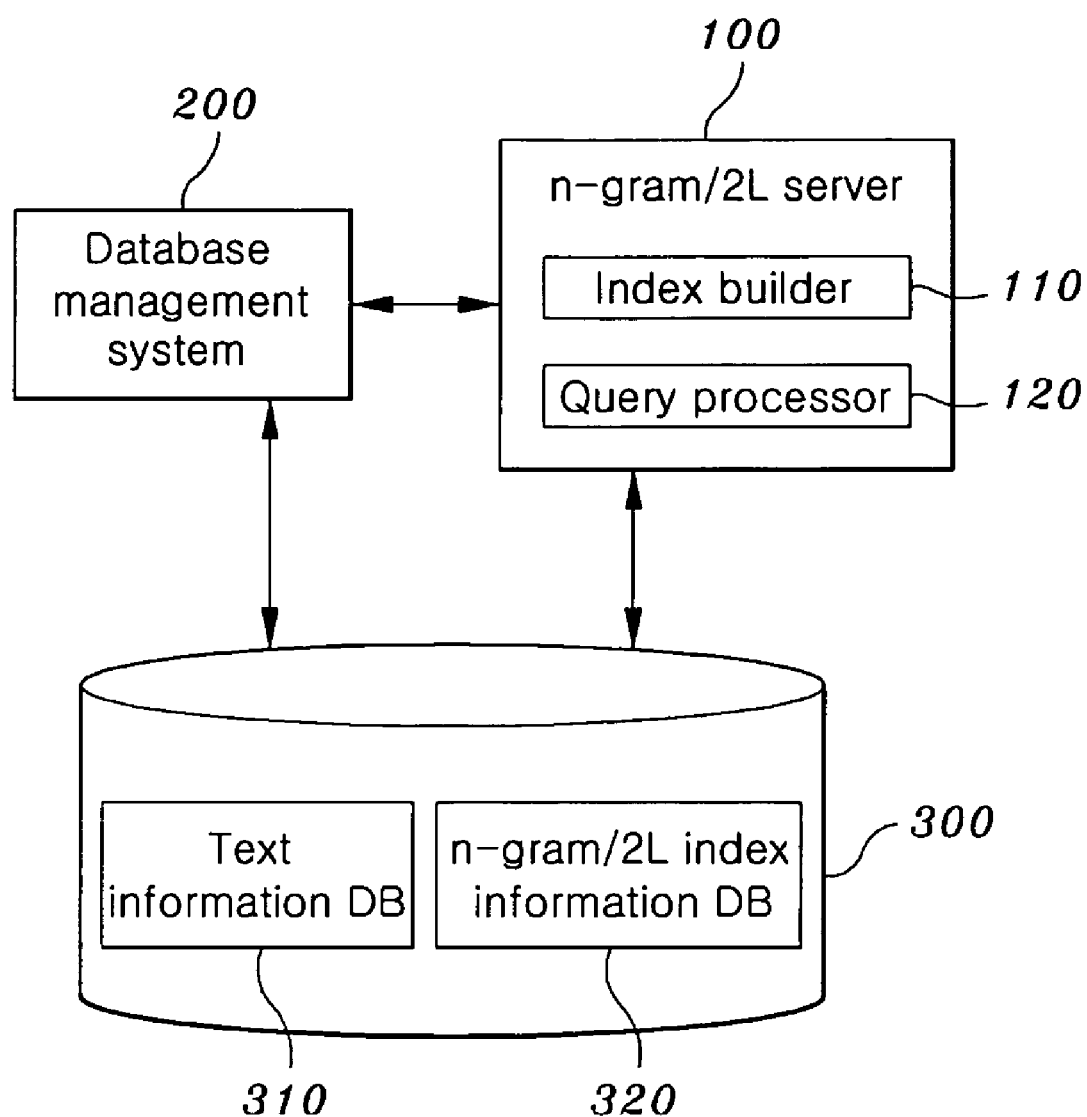
FIG. 4 is a block diagram illustrating a hardware structure for materializing the present invention.

FIG. 4 is a block diagram illustrating a hardware structure for materializing the present invention comprising an n-gram/2L server 100, a database management system 200 and a database 300.

The n-gram/2L server 100 includes an index builder 110 for generating n-gram/2L indexes and a query processor 120 for processing queries using the n-gram/2L indexes. The database 300 includes a text information DB 310 for storing various text information and an n-gram/2L index information DB 320 for storing the n-gram/2L indexes.

The n-gram/2L server 100 connected with the database management system 200 generates n-gram/2L indexes to the n-gram/2L index information DB 320 of the database 300 and processes queries using the same.

The database management system 200 manages the text information DB 310 stored in the database 300.

Next, a structure of n-gram/2L index of the present invention materialized in such system will now be described in detail.

Figure 5:
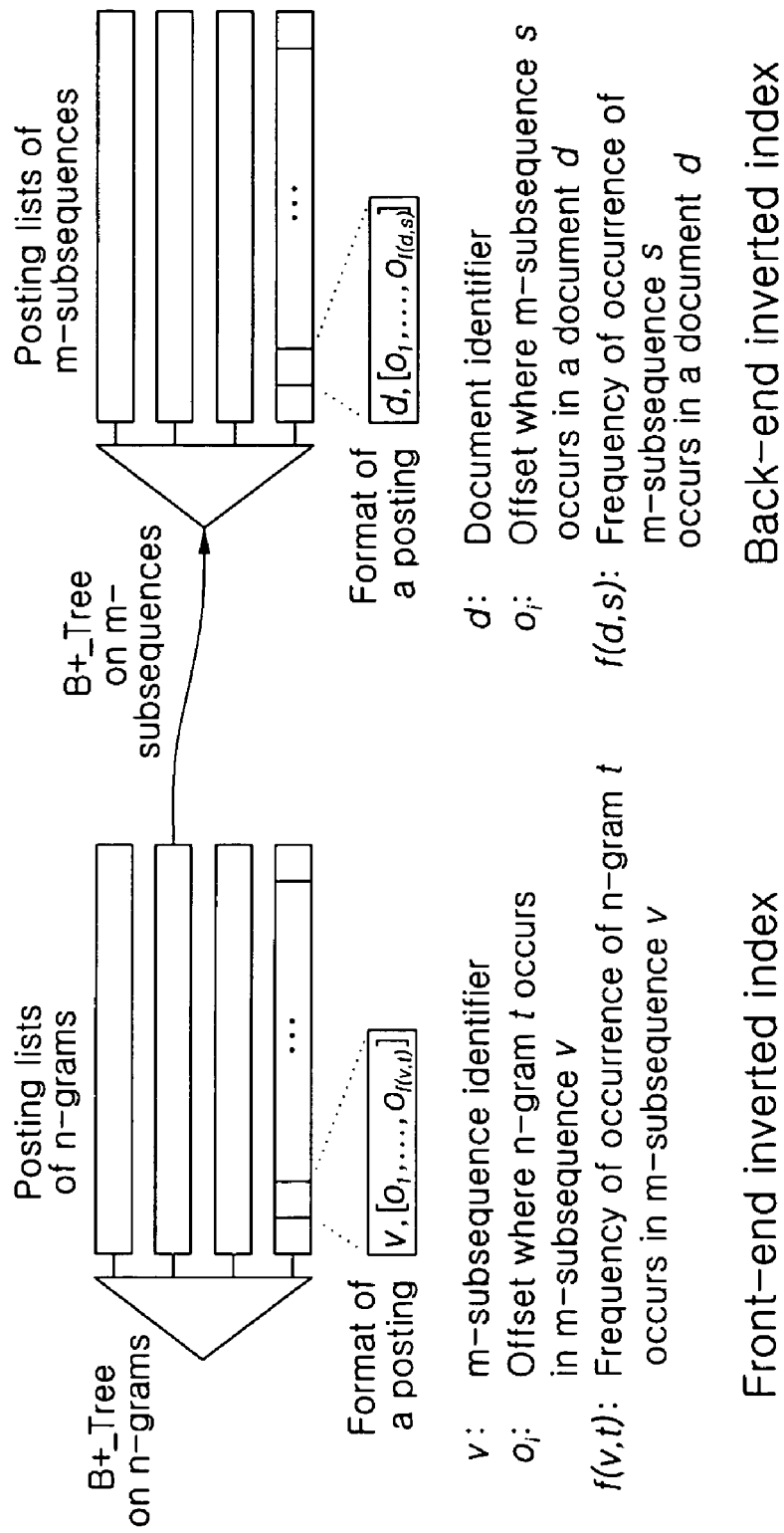
FIG. 5 depicts a structure of n-gram/2L index in accordance with the present invention.

The n-gram/2L index of the present invention consists of a front-end inverted index and a back-end inverted index and FIG. 5 depicts a structure of the n-gram/2L index in accordance with the present invention.

In the present invention, an m-subsequence denotes a subsequence of length m, n denotes the length of the n-gram and m denotes the length of the m-subsequence.

The back-end inverted index uses m-subsequences extracted from documents as a term and stores the position information, where the m-subsequences occur in the documents, in the posting lists corresponding to the respective m-subsequences.

The front-end inverted index uses n-grams extracted from the m-subsequences as a term and stores the position information offsets, where the n-grams appear in the m-subsequences, in the posting lists corresponding to the respective n-grams.

Subsequently, a method of building a two-level n-gram inverted index (n-gram/2L index) will now be described.

The n-gram/2L index is built from the text information given from the text information DB 310 of the database 300 through the following four steps: (1) extracting m-subsequences, (2) building a back-end inverted index, (3) extracting n-grams, and (4) building a front-end inverted index, which are executed by the index builder 110 of the n-gram/2L server 100.

In the step of extracting m-subsequences, the length of subsequences is fixed to m and consecutive subsequences are extracted to be overlapped with each other by n−1. Such overlapping is to prevent the n-grams from missing or being duplicated. The correctness of the method will now be identified in theorem 1 below.

Theorem 1:

If overlapping the consecutive m-subsequences in the step of extracting the m-subsequences with each other by n−1, there may be no n-grams missing or duplicated in the step of extracting the n-grams.

Proof:

If a document d is given as a sequence of characters $c_0$, $c_1, \ldots, c_{N-1}$, the number of n-grams extracted from the document d is N−n+1, and the first character of each n-gram is $c_i$ ($0 \leq i < N-n+1$).

Moreover, if the length of an m-subsequence is given as m, the number of m-subsequences extracted from the document d is (N−n+1)/(m−n+1), and the first character of each subsequence is $c_j$ [$0 \leq j < (N-n+1)/(m-n+1)$]. For the convenience of explanation, the n-gram starting with character $c_i$ is to be expressed by $N_i$ and the m-subsequence starting with character $c_j$ is represented by $S_j$.

If any adjacent two m-subsequences extracted from the document d, are called $S_p$ and $S_q$, the n-grams extracted from $S_p$ are $N_p, \ldots, N_{p+m-n}$, and the n-grams extracted from $S_q$ are $N_q, \ldots, N_{q+m-n}$.

Suppose that $S_p$ and $S_q$ overlap with each other by the length of 1, the length of 1 is divided into the following three cases: (1) 1=n−1, (2) 1<n−1, and (3) 1>n−1. Theorem 1 will now be proven by checking the respective cases whether or not there are n-grams missing or duplicated in the n-grams extracted from the two m-subsequences $S_p$ and $S_q$.

Case (1) 1=n−1: Since $S_p$ and $S_q$ overlap with each other by n−1, q=p+m−n+1, and the n-grams extracted from $S_q$ are expressed by $N_{p+m-n+1}, \ldots, N_{p+2m-2n+1}$ again. Since those extracted from $S_p$ are $N_p, \ldots, N_{p+m-n}$, the n-grams of $N_p, \ldots, N_{p+m-n}, N_{p+m-n+1}, \ldots, N_{p+2m-2n+1}$ are extracted from the two m-subsequences $S_p$ and $S_q$ only once without missing or duplicated.

Case (2) $1<n-1$: Assuming that $l=n-2$ without a loss of generality, since $S_p$ and $S_q$ overlap with each other by $n-2$, $q=p+m-n+2$ and, accordingly, the n-grams extracted from $S_q$ are represented by $N_{p+m-n+2}, \ldots, N_{p+2m-2n+2}$ again. And those from $S_p$ are $N_p, \ldots, N_{p+m-n}$. Since the n-gram $N_{p+m-n+1}$ is not extracted from either $S_p$ or $S_q$, there must be a missing n-gram.

Case (3) $1>n-1$: Assuming that $l=n$ without a loss of generality, since $S_p$ and $S_q$ overlap with each other by $n$, $q=p+m-n$, and the n-grams extracted from $S_q$ are represented by $N_{p+m-n}, \ldots, N_{p+2m-2n}$. And those from $S_p$ are $N_p, \ldots, N_{p+m-n}$. Since the n-gram $N_{p+m-n}$ is extracted once from each $S_p$ and $S_q$, there must be a duplicated n-gram.

Accordingly, it is possible to prevent the n-gram from missing or being duplicated by overlapping adjacent two m-subsequences with each other by n−1 in the step of extracting m-subsequences.

Figure 6:
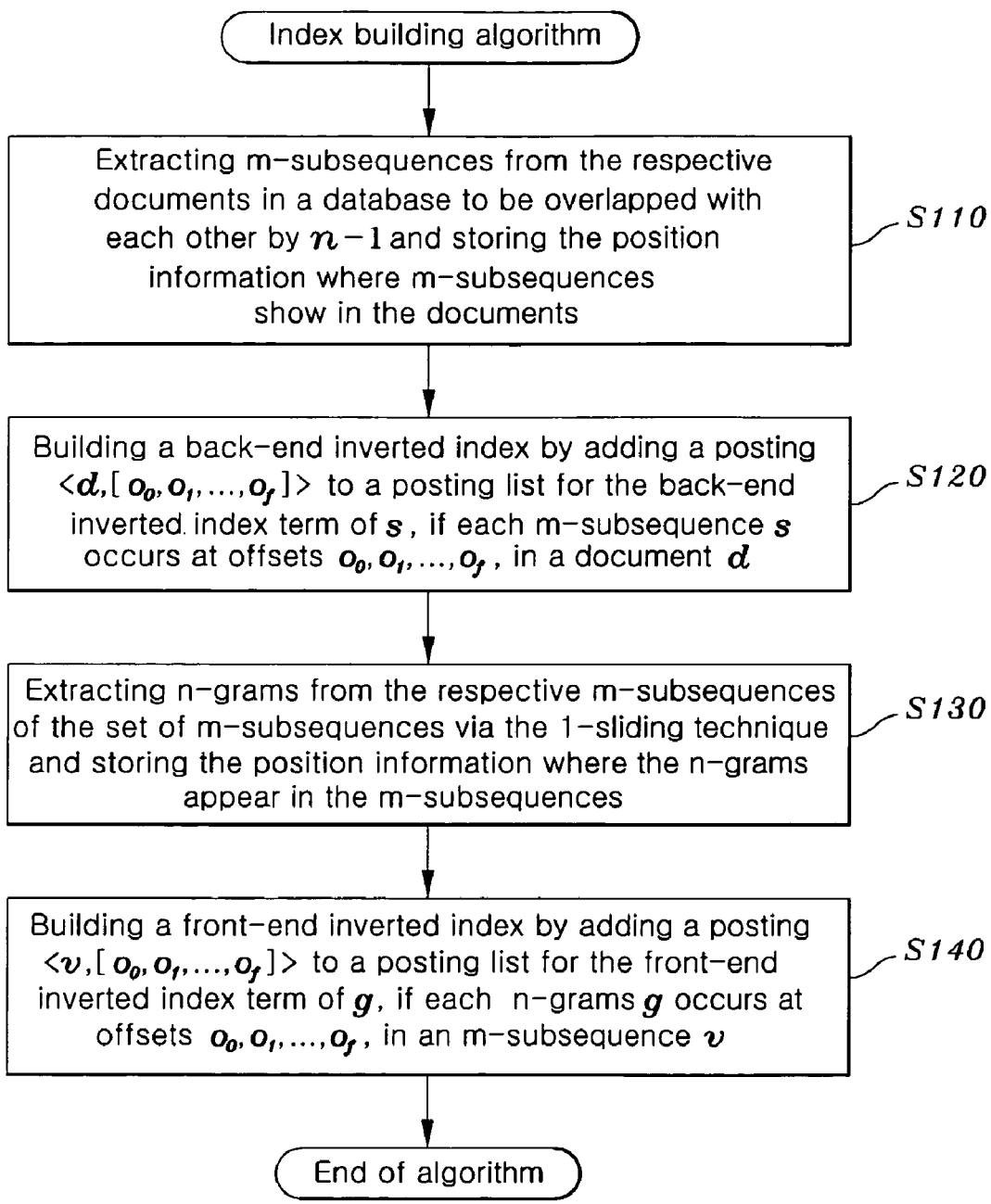
FIG. 6 is a flowchart illustrating an algorithm of building the n-gram/2L index in accordance with the present invention.

Next, the index building algorithm of the n-gram/2L index receives the document database, the length of an m-subsequence, and the length of an n-gram as an input and builds the n-gram/2L index as an output. FIG. 6 is a flowchart illustrating the algorithm of building the n-gram/2L index in accordance with the present invention in detail.

Referring to FIG. 6, in step S110, the algorithm extracts m-subsequences from the respective documents in the text information DB 310 of the database 300 to be overlapped with each other by n−1 and stores the position information where m-subsequences show in the documents.

That is, if each document is composed of a sequence of characters $c_{0, c1}, \ldots, c_{N-1}$, the algorithm extracts m-subsequences starting with the character $c_{i*(m-n+1)}$ for all i, where $0 \leq i < (N-n+1)/(m-n+1)$. If the length of the last m-subsequence is less than m, the algorithm appends blank characters to the end of the string of the characters, thus guaranteeing the length of m.

In step S120, the algorithm builds a back-end inverted index by adding a posting $<d, [o_1, \ldots, o_f]>$ to a posting list for the back-end inverted index term of s, if each m-subsequence s occurs at offsets $o_1, \ldots, o_f$ in a document d, for the respective position information stored in step S110 above.

Subsequently, in step S130, the algorithm extracts n-grams from the respective m-subsequences of the set of m-subsequences obtained in step S110 via the 1-sliding technique and stores the position information where the n-grams appear in the m-subsequences.

In step S140, the algorithm builds a front-end inverted index by adding a posting $<v, [o_1, \ldots, o_f]>$ to a posting list for the back-end inverted index term of g, if each m-subsequence s occurs at offsets $o_1, \ldots, o_f$ in an m-subsequence v, for the respective position information stored in step S110 above.

Figure 7:
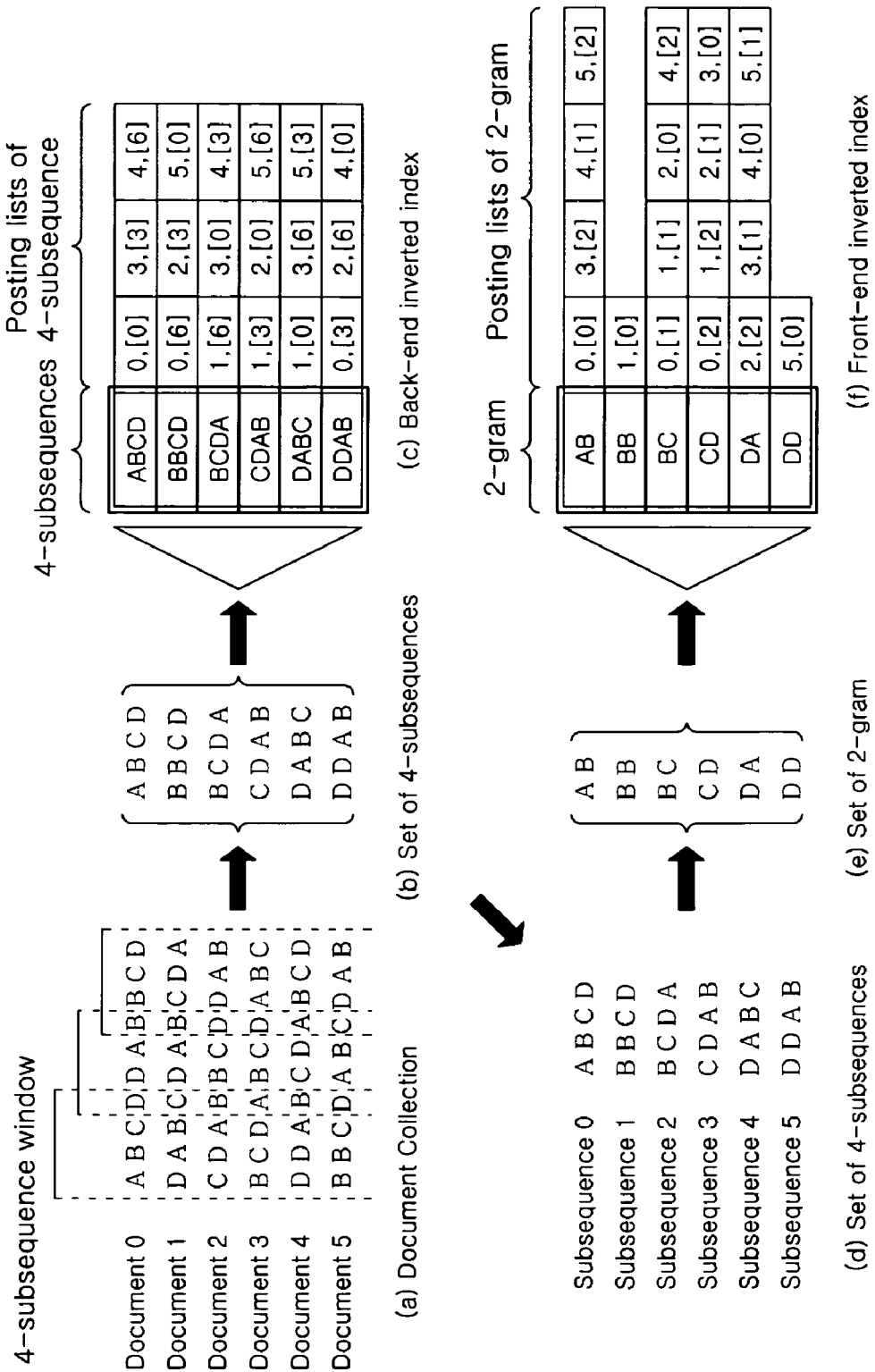
FIG. 7 shows an example of building the n-gram/2L index in accordance with the present invention.

FIG. 7 shows an example of building the n-gram/2L index from the set of given documents, wherein n=2 and m=4.

FIG. 7A shows a set of given documents and FIG. 7B shows a set of the 4-subsequences extracted from the set of documents shown in FIG. 7A according to step S110. Since the documents are split by the 4-subsequences having the length of 4 and overlapped with each other by 1 (i.e., n−1), the documents extracted from the document 0 are "ABCD", "DDAB" and "BBCD".

FIG. 7C shows a back-end inverted index built from the set of 4-subsequences extracted in step S120 above. Since the 4-subsequence "ABCD" occurs at the offsets 0, 3 and 6 in the documents 0, 3 and 4, respectively, the postings <0, [0]>, <3, [3]> and <4, [6]> are appended to the posting list related to the 4-subsequence "ABCD".

FIG. 7D shows the set of the 4-subsequences and their identifiers and FIG. 7E shows the set of the 2-grams extracted from the 4-subsequences in step S130 above. Since the 2-grams are extracted via the 1-sliding technique, those extracted from the 4-subsequence 0 are "AB", "BC" and "CD".

FIG. 7F shows the front-end inverted index built from the set of the 2-grams in step S140 above. Since the 2-gram "AB" occurs at the offsets 0, 2, 1 and 2 in the 4-subsequences 0, 3, 4 and 5, respectively, the postings <0, [0]>, <3, [2]>, <4, [1]> and <5, [2]> are appended to the posting list related to the 2-gram "AB".

Subsequently, a method of processing queries of two-level n-gram inverted index (n-gram/2L index) will now be described.

The query process using the n-gram/2L index is executed by the query processor 120 of the n-gram/2L server 100 of the present invention and consists of the following two steps: (1) searching the front-end inverted index to retrieve candidate results; and (2) searching the back-end inverted index to obtain a final result.

In the first step, the m-subsequences that cover a given query string are selected by searching the front-end inverted index with the n-grams extracted by splitting the query string. The m-subsequences that do not cover the query string are filtered out in this step.

In the second step, the documents that have a set of m-subsequences $\{S_i\}$ containing the query string are selected by searching the back-end inverted index with the m-subsequences retrieved in the first step.

The term of cover will now be defined formally in Definition 1 and the term of contain be defined in Definition 2.

Definition 1:

S covers Q, if an m-subsequence S satisfies one of the following four conditions for a query string Q: (1) a suffix of S matches a prefix of Q; (2) the whole string of S matches a substring of Q; (3) a prefix of S matches a suffix of Q; and (4) a substring of S matches the whole string of Q.

Definition 2:

An expand function expanding a sequence of overlapping character sequences into one character sequence is defined as follows: (1) Suppose that two character sequences $S_i$ and $S_p$ are given as $c_i \ldots c_j$ and $c_p \ldots c_q$, respectively, and a suffix of $S_i$ and a prefix of $S_p$ overlap by k (i.e., $c_{j-k+1} \ldots c_j = c_p \ldots c_{p+k-1}$, wherein $k \geq 0$). Then, $\text{expand}(S_i S_p) = c_i \ldots c_j c_{p+k} \ldots c_q$; and (2) For more than two character sequences, expand $(S_l S_{l+1} \ldots S_m) = \text{expand}(\text{expand}(S_l S_{l+1}), S_{l+2} \ldots S_m)$.

Definition 3:

$\{S_i\}$ contains Q, if a set of m-subsequences $\{S_i\}$ satisfies the following condition: if a sequence of m-subsequences consecutively overlapped with each other in $\{S_i\}$ is $S_l S_{l+1} \ldots S_m$, a substring of $\text{expand}(S_l S_{l+1} \ldots S_m)$ matches the whole string of Q.

Figure 8A:
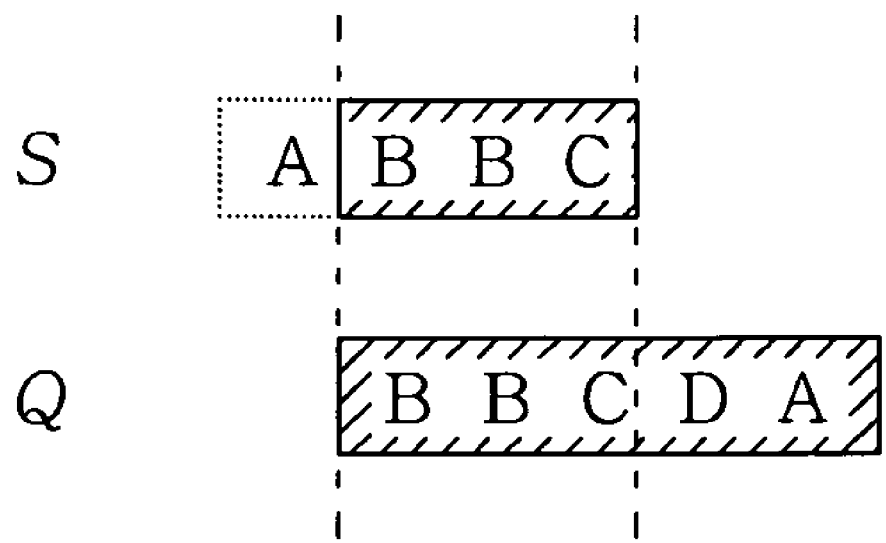
FIG. 8A shows an example of an m-subsequence S covering a query Q and FIG. 8B shows an example of an-m-subsequence S not covering a query Q.
Figure 8B:
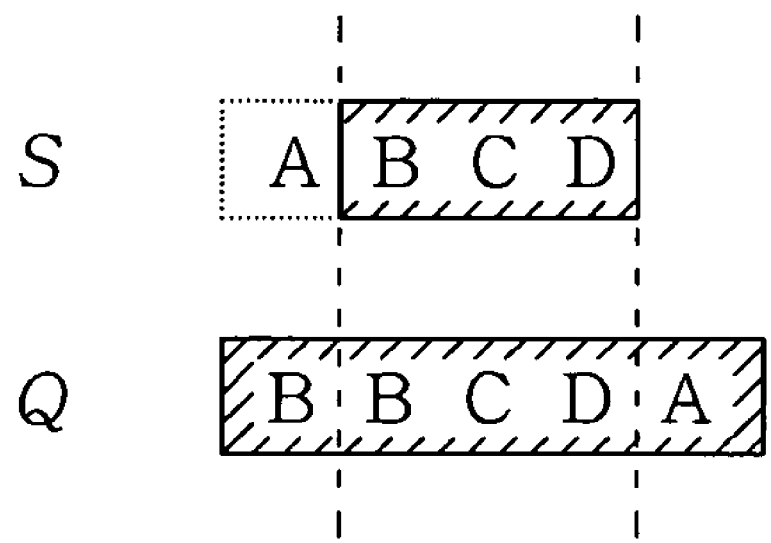

FIG. 8A shows an example of an m-subsequence S covering a query Q and FIG. 8B shows an example of an m-subsequence S not covering a query Q. In FIG. 8A, S covers Q, since a suffix of S matches a prefix of Q. In FIG. 8B, S does not cover Q, since a substring of S "BCD" does not satisfy any of the four conditions in Definition 1.

Lemma 1:

A document that has a set of m-subsequences $\{S_i\}$ containing the query string Q includes at least one m-subsequence covering Q.

Figure 9A:
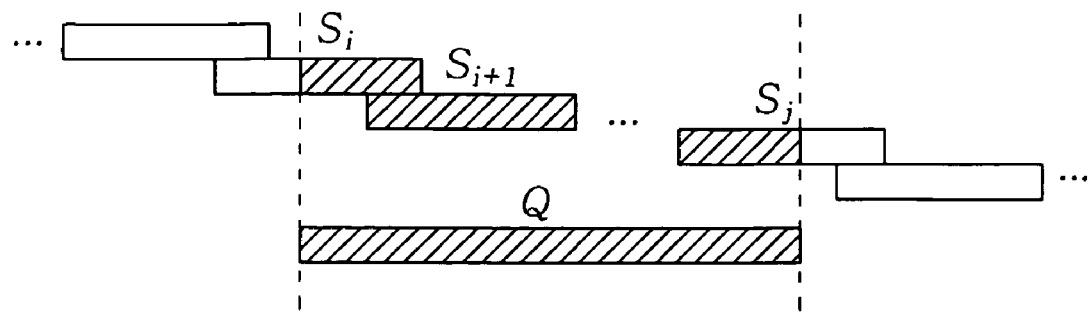
FIGS. 9A to 9C show examples of a set of m-subsequences S containing queries Q.
Figure 9B:
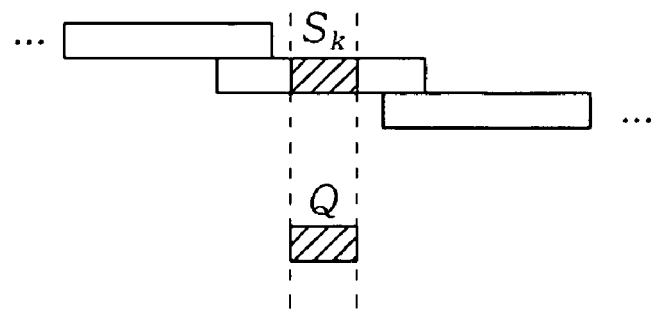
Figure 9C:
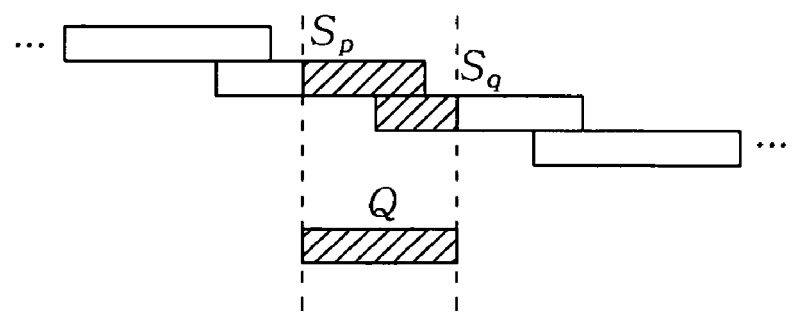

Proof:

First, FIGS. 9A to 9C show all cases where a set of m-subsequences $\{S_i\}$ contains Q. Here, FIG. 9A shows a case where the length of Q Len(Q)≧m; and FIGS. 9B and 9C show cases where Len(Q)<m.

In FIG. 9A, the set of (j−i+1) m-subsequences $\{S_i, \ldots, S_j\}$ contains Q; in FIG. 9B, one m-subsequence $S_k$ contain Q; and in FIG. 9C, the set of two m-subsequences $\{S_p, S_q\}$ contains Q.

Like this, it can be seen that, if the set of m-sequences $\{S_i\}$ contains Q, the respective m-subsequences in $\{S_i\}$ cover Q.

Accordingly, the document, from which such set of m-sequences $\{S_i\}$ is extracted, contains at least one m-subsequence covering Q.

Next, the query process of the n-gram/2L index receives the n-gram/2L index and the query string Q as an input, finds identifiers of documents matching with Q and returns them as an output.

Figure 10:
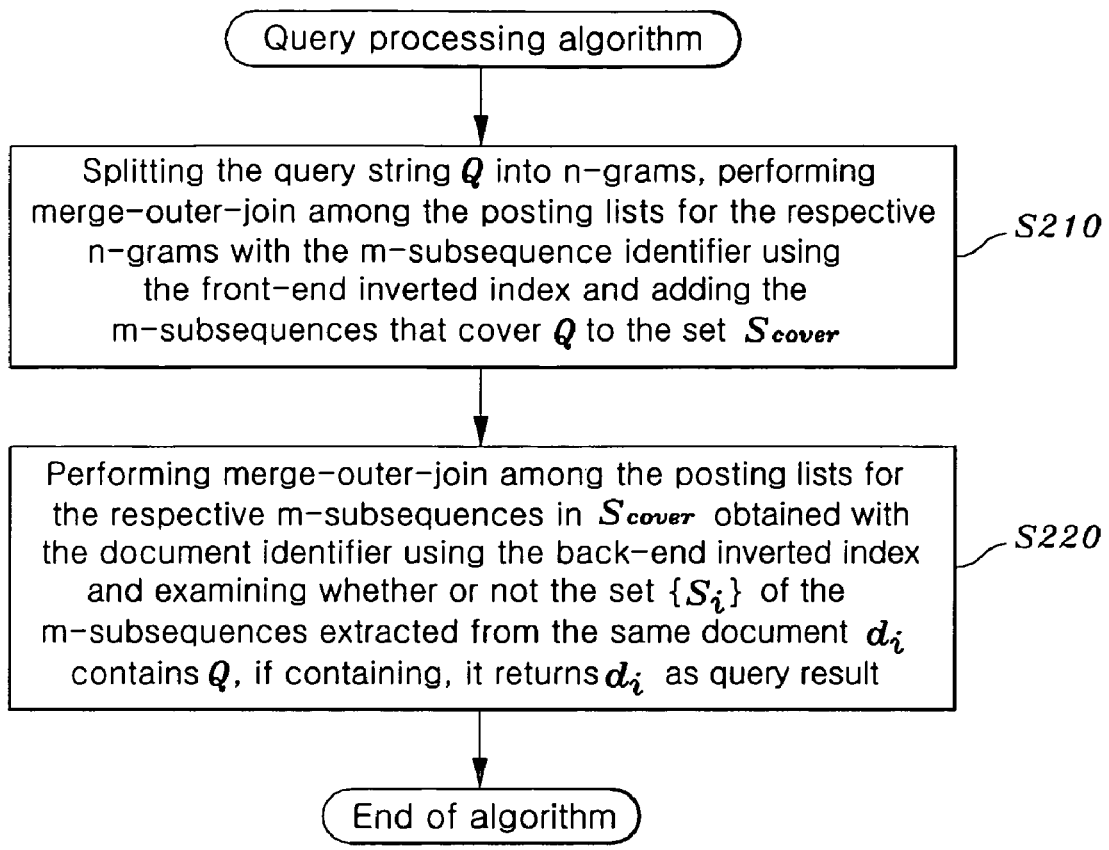
FIG. 10 is a flowchart illustrating an algorithm of processing queries using the n-gram/2L index in accordance with the present invention.

FIG. 10 is a flowchart illustrating an algorithm of processing queries using the n-gram/2L index in accordance with the present invention.

Referring to FIG. 10, in step S210, after splitting the query string Q into multiple n-grams, the algorithm performs merge-outer-join among the posting lists for the respective n-grams with the m-subsequence identifier using the front-end inverted index and adds the m-subsequences, which cover Q according to Definition 1, i.e., m-subsequences that satisfy a necessary condition in Lemma 1, to the set $S_{cover}$.

Since an m-subsequence covering Q typically does not have all n-grams extracted from Q, the algorithm performs merge-outer-join in step S210.

Here, the algorithm uses the offset information in the postings to be merge-outer-joined in order to check whether or not the m-subsequence covers Q.

In step S220, the algorithm performs the merge-outer-join among the posting lists for the respective m-subsequences in $S_{cover}$ obtained in step S210 with the document identifier using the back-end inverted index and examines whether or not the set $\{S_i\}$ of the m-subsequences extracted from the same document di contains Q according to Definition 3.

If $\{S_i\}$ contains Q, the algorithm returns $d_i$ as a query result. Here, the algorithm uses the offset information in the postings to be merge-outer-joined in order to check whether or not $\{S_i\}$ contains Q.

Figure 11:
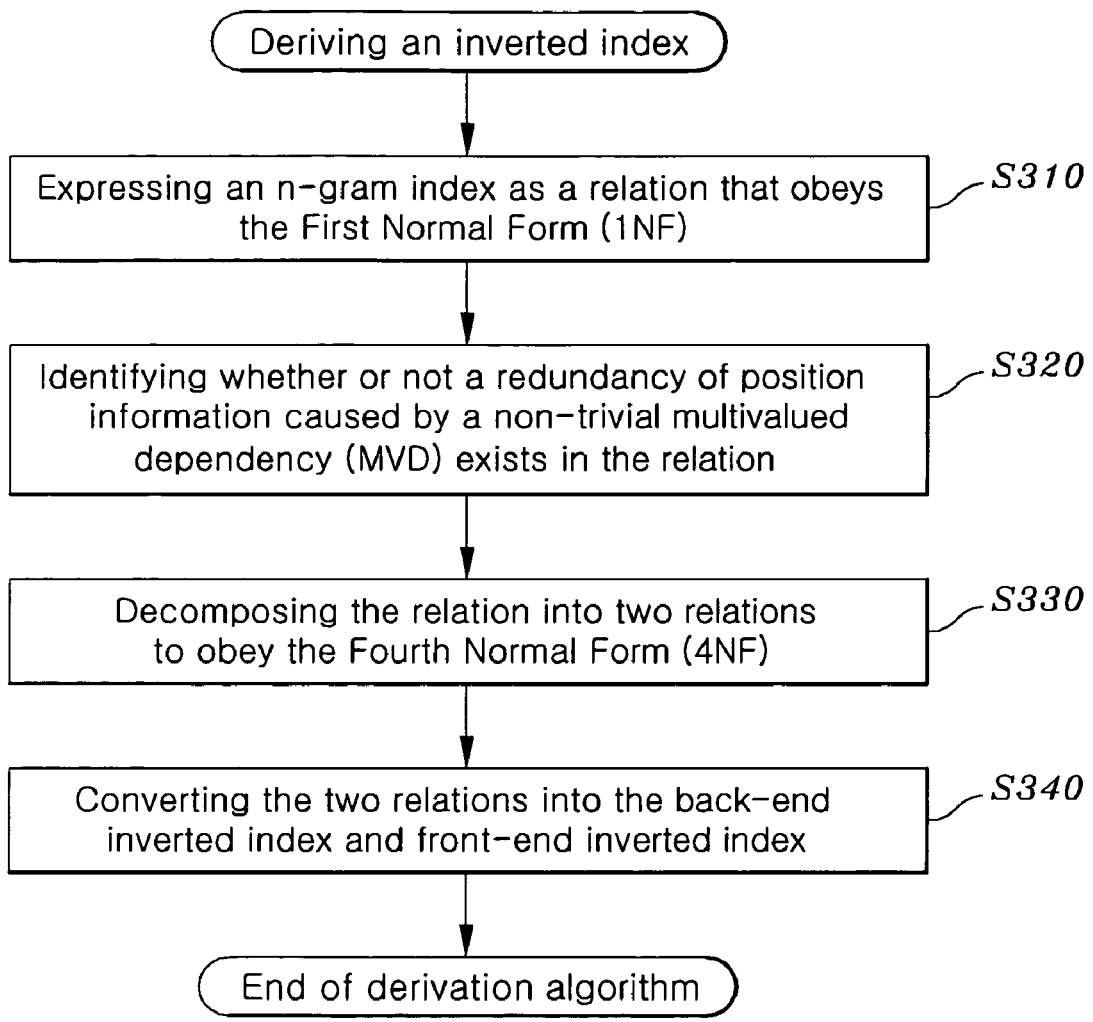
FIG. 11 is a flowchart illustrating an algorithm for deriving an n-gram/2L index structure in accordance with the present invention.

Next, a method for deriving the n-gram/2L index will now be described with reference to FIG. 11.

The present invention derives the n-gram/2L index from the n-gram indexes through the following four steps: expressing the n-gram index as the relation that obeys the First Normal Form (1NF) (S310); identifying whether or not the redundancy of the position information caused by a non-trivial multivalued dependency (MVD) exists in the relation obtained in step S310 (S320); decomposing the relation obtained in step S310 into the two relations to obey the Fourth Normal Form (4NF) in order to eliminate the redundancy identified in step 320 (S330); and converting the two relations obtained in step 330 into the back-end inverted index and front-end inverted index (S340).

First, in step 310, the relation that converts the n-gram inverted index to the First Normal Form (1NF) is considered for the sake of theoretical development. Such relation is called the NDO relation. This relation has three attributes N, D and O. Here, N indicates n-grams, D denotes document identifiers, and O represents offsets.

Further, an attribute S is added to the relation NDO and the attribute O is split into two attributes $O_1$ and $O_2$. The relation that is converted to have five attributes S, N, D, $O_1$ and $O_2$ is called the $SNDO_1O_2$ relation.

Here, S indicates m-subsequences, from which n-grams are extracted, $O_1$ denotes the offsets where the n-grams appear in the m-subsequences, and $O_2$ the offsets where the m-subsequences occur in documents.

The values of the attributes S, $O_1$ and $O_2$ appended to the relation $SNDO_1O_2$ are automatically determined by those of the attributes N, D and O in the relation NDO. Suppose that the respective documents in the set of given documents are split to be overlapped with the m-subsequences by n−1. Then, a specific n-gram extracted from the set of documents belongs to only one m-subsequence according to Theorem 1 above.

In a tuple (s, n, d, $o_1$, $o_2$) of the relation $SNDO_1O_2$ automatically determined by a voluntary tuple (n, d, o) of the relation NDO, s represents the m-subsequence, to which the n-gram n occurring at the offset o in the document d belongs to. $o_1$ is the offset where the n-gram n occurs in the m-subsequence s, and $o_2$ is the offset where the m-subsequence s occurs in the document d.

Figure 1:
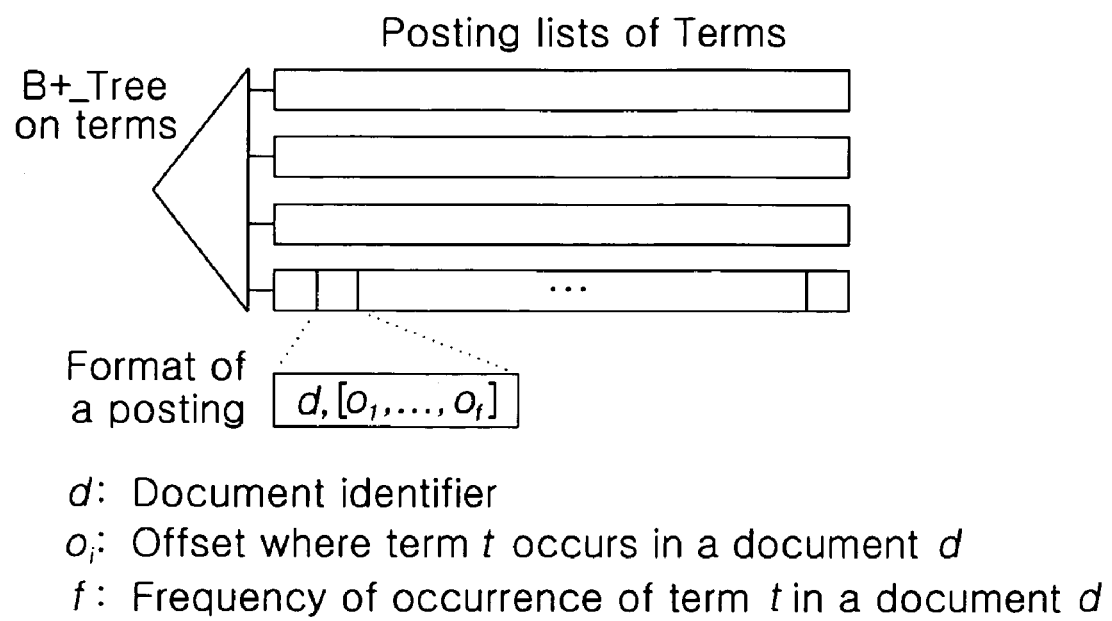
FIG. 1 shows a structure of a general inverted index structure.
Figures 2A, 2B:
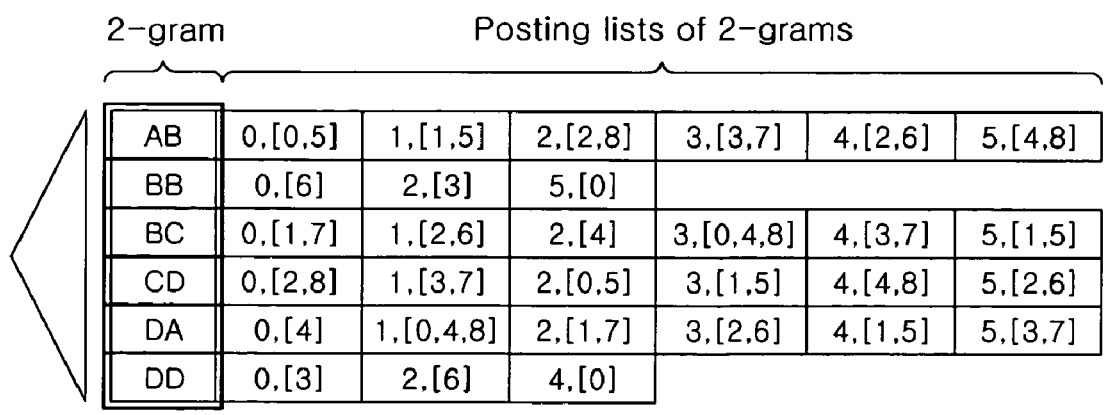
FIGS. 2A and 2B show examples of n-gram indexes.
Figure 12:
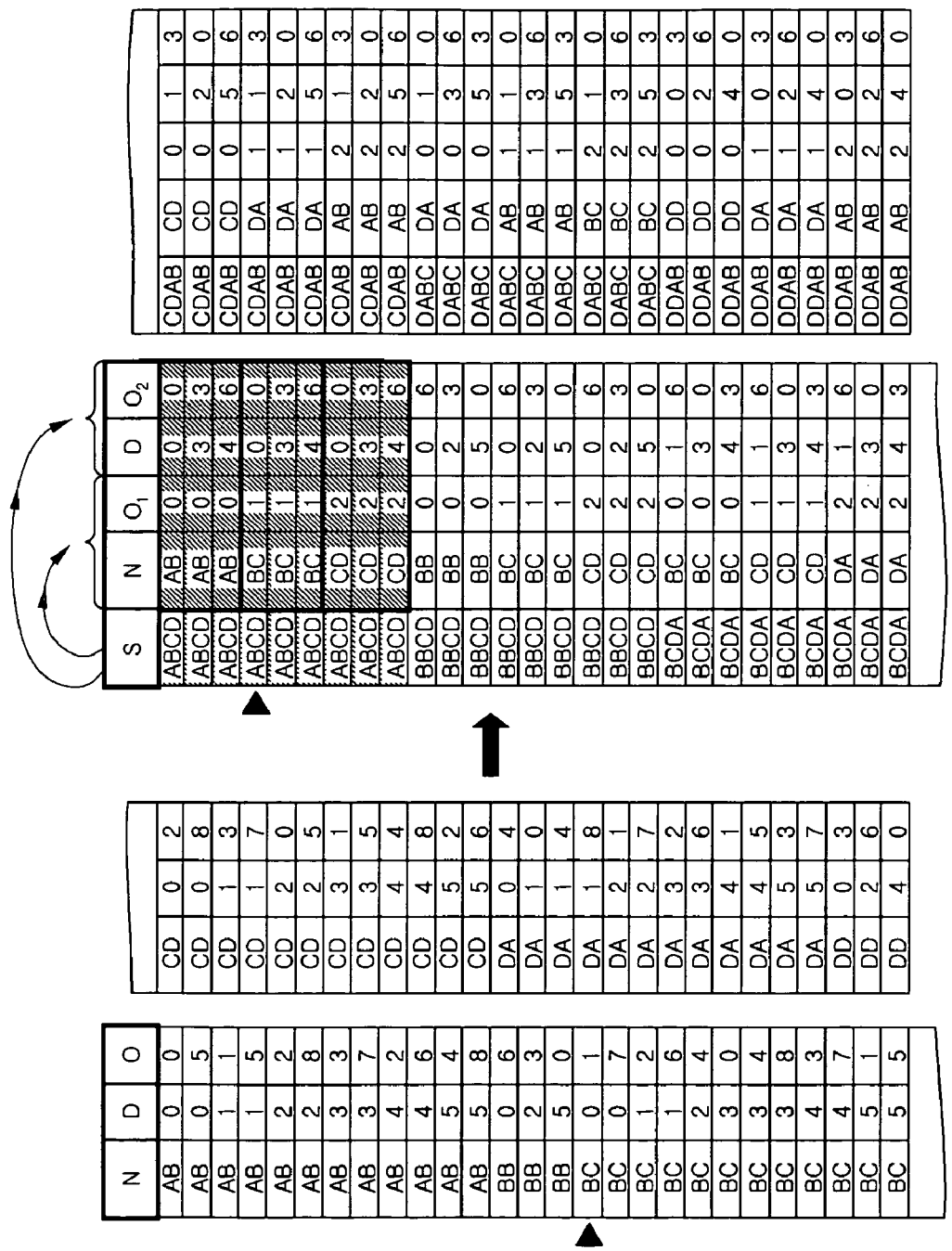
FIG. 12 shows an example that a non-trivial multivalued dependency (MVD) exists in a relation $SNDO_1O_2$.

FIG. 12 shows an example of the relation NDO converted from 2-gram inverted index of FIG. 2B and an example of the relation $SNDO_1O_2$ (m=4) derived from the relation NDO. Here, the tuples of the relation $SNDO_1O_2$ are sorted by the values of attribute S.

In FIG. 12, the marked tuples of the relation $SNDO_1O_2$ is automatically determined by the marked tuple of the relation NDO.

Since the 2-gram "BC" at the offset 1 in the document 0 belongs to the 4-subsequence "ABCD" in FIG. 7A, the value of the attribute S of the marked tuple becomes "ABCD".

The values of the attribute $O_1$ and $O_2$ are determined as the offset 1 is determined as the offset 1 where the 2-gram "BC" occurs in the 4-subsequence "ABCD" and as the offset 0 where the 4-subsequence "ABCD" appears in the document 0, respectively.

Next, in step S320, it is proven that the non-trivial MVDs exist in the relation $SNDO_1O_2$ obtained in step S310 via Lemma 2 below.

Lemma 2:

The non-trivial MVDs S→→$NO_1$ and S→→$DO_2$ exist in the relation $SNDO_1O_2$. Here, S is not a superkey.

Proof:

According to the definition of the MVD (Jeffery D. Ullman, Principles of Database and Knowledge-Base Systems Vol. I, Computer Science Press, USA, 1988., Ramez Elmasri and Shamkant B. Navathe, Fundamentals of Database Systems, Addison Wesley, 4th ed., 2003., Abraham Silberschatz, Henry F. Korth, and S. Sudarshan, Database Systems Concepts, McGraw-Hill, 4th ed., 2001), the non-trivial MVD X→→Y exists in a schema R, wherein X and Y are subsets of R, if two tuples μ and ν with μ, ν∈r, μ[X]=ν[X] exist in a voluntary relation r for the schema R, and if the relation r also contains two tuples φ and ψ, which satisfy three conditions below.

Moreover, X→→Y is a non-trivial MVD, if Y↛X and X∪Y≠R (i.e., R-X-Y≠∅), which means that Y and R-X-Y are non-empty sets of attributes (Ramez Elmasri and Shamkant B. Navathe, Fundamentals of Database Systems, Addison Wesley, 4th ed., 2003., Abraham Silberschatz, Henry F. Korth, and S. Sudarshan, Database Systems Concepts, McGraw-Hill, 4th ed., 2001).

That is, a non-trivial MVD exists, if the values of Y and the values R-X-Y for any value of the attribute X form a Cartesian product (Raghu Ramakrishnan, Database Management Systems, McGraw-Hill, 1998).

1. $\phi[X]=\psi[X]=\mu[X]=\nu[X]$
2. $\phi[Y]=\mu[Y]$ and $\phi[R-X-Y]=\nu[R-X-Y]$
3. $\psi[Y]=\nu[Y]$ and $\psi[R-X-Y]=\mu[R-X-Y]$ If a set of m-subsequences extracted from a set of given documents is $\{S_1, \ldots S_r\}$, a set of n-grams $\{N_{i1}, \ldots, N_{iq}\}$ extracted from an m-subsequence $S_i$ is always extracted from a set of documents $\{D_{i1}, \ldots, D_{ip}\}$ where $S_i$ occurs (1<i<r).

Accordingly, in the set of tuples where the value of attribute S is m-subsequence $S_i$, the values of attribute $NO_1$ representing the n-grams extracted from $S_i$ and the values of attribute $DO_2$ representing the documents containing $S_i$ always form a Cartesian product.

Suppose that $R=SNDO_1O_2$, $X=S$, $Y=NO_1$, and $R-X-Y=DO_2$, the three conditions above are satisfied because the values of attribute Y and the values of attribute R-X-Y for any value of attribute X form a Cartesian product. These conditions above are satisfied also when $Y=DO_2$.

In addition, $NO_1 \twoheadrightarrow S$, $DO_2 \twoheadrightarrow S$, $NO_1 \cup S \neq SNDO_1O_2$, and $DO_2 \cup S \neq SNDO_1O_2$.

Thus, the non-trivial MVDs $S \twoheadrightarrow \twoheadrightarrow NO_1$ and $S \twoheadrightarrow \twoheadrightarrow DO_2$ exist in the relation $SNDO_1O_2$. Here, S is obviously not a superkey as shown in the right example of FIG. 12.

Intuitively describing, non-trivial MVDs exist in the relation $SNDO_1O_2$ because the set of documents, where an m-subsequence occurs, and the set of n-grams, which are extracted from such m-subsequence, have no connection with each other.

Like this, if such attributes having no connection with each other lie in a relation, the non-trivial MVDs exist in such relation (Jeffery D. Ullman, Principles of Database and Knowledge-Base Systems Vol. I, Computer Science Press, USA, 1988., Raghu Ramakrishnan, Database Management Systems, McGraw-Hill, 1998., Ramez Elmasri and Shamkant B. Navathe, Fundamentals of Database Systems, Addison Wesley, 4th ed., 2003., Abraham Silberschatz, Henry F. Korth, and S. Sudarshan, Database Systems Concepts, McGraw-Hill, 4th ed., 2001).

In the relation $SNDO_1O_2$, there exist the tuples corresponding to all possible combinations of document identifiers and n-grams for a given m-subsequence due to the independence between the set of documents and the set of n-grams.

The right of FIG. 12 shows an example showing the existence of the non-trivial MVDs $S \twoheadrightarrow \twoheadrightarrow NO_1$ and $S \twoheadrightarrow \twoheadrightarrow DO_2$ in the relation $SNDO_1O_2$. Reviewing the shaded tuples of the relation $SNDO_1O_2$ shown in the right of FIG. 12, there exists the redundancy that the values of two attribute D and $O_2$, (0, 0), (3, 3) and (4, 6) repeatedly appear for the values of two attribute N and $O_1$, ("AB", 0), ("BC", 1) and ("CD", 2). That is, the $NO_1$ and the $DO_2$ form a Cartesian product in the tuples where S="ABCD". I can be seen that such repetitions also occur in the other values of attribute S.

In step S330 above, the relation $SNDO_1O_2$ obtained in step S310 is decomposed into the two relations to obey the Fourth Normal Form (4NF) in order to eliminate the redundancy of the position information identified in step S320.

First, it will now be proven that the relation $SNDO_1O_2$ is not the 4NF in Theorem 2 below. Then, it will be proven that the two relations $SNO_1$ and $SDO_2$ decomposed by the relation $SNDO_1O_2$ obey the 4NF in Lemma 3.

Theorem 2:
The relation $SNDO_1O_2$ is not in the Fourth Normal Form (4NF).
Proof:
A non-trivial MVD $S \twoheadrightarrow \twoheadrightarrow NO_1$ exists, where S is not a superkey.

Lemma 3:
If the relation $SNDO_1O_2$ is decomposed into two relations $SNO_1$ and $SDO_2$, the respective relations are in 4NF.
Proof:
The non-trivial MVDs in the relation $SNO_1$ are $SO \twoheadrightarrow \twoheadrightarrow N$ and $SNO_1 \twoheadrightarrow \twoheadrightarrow S|N|O_1$,. Moreover, those in the relation $SDO_2$ are $DO_2 \twoheadrightarrow \twoheadrightarrow S$ and $SDO_2 \twoheadrightarrow \twoheadrightarrow S|D|O_2$. All of these MVDs are trivial ones and do not violate the 4NF.

Next, step S340 will be illustrated.

In this step, it will now be proven that the two relations $SNO_1$ and $SDO_2$ obtained by decomposing the relation $SNDO_1O_2$ to obey the 4NF in step S330 above can be converted into the front-end and back-end inverted indexes of the n-gram/2L index in Theorem 3 below.

Thus, it can be proved theoretically that the redundancy caused by a non-trivial MVD does not exist in the n-gram/2L index (Jeffery D. Ullman, Principles of Database and Knowledge-Base Systems Vol. I, Computer Science Press, USA, 1988).

Theorem 3:
The relations $SNO_1$ and $SDO_2$ decomposed by the relation $SNDO_1O_2$ to obey the 4NF become the front-end and back-end inverted indexes of the n-gram/2L index, respectively.
Proof:
The relation $SNO_1$ is represented as the front-end inverted index by regarding the attributes N, S and $O_1$ as terms, an m-subsequence identifier and position information, respectively. Similarly, the relation $SDO_2$ is represented as the back-end index by regarding the attributes S, D and $O_2$ as terms, a document identifier and position information, respectively.

Therefore, the result of decomposing the relation $SNDO_1O_2$ into the relations $SNO_1$ and $SDO_2$ becomes the front-end and back-end inverted indexes of the n-gram/2L index.

FIG. 13 shows the result of decomposing the relation $SNDO_1O_2$ of FIG. 12 into two relations $SNO_1$ and $SDO_2$. In the value of attribute S of the relation $SDO_2$, the values in parentheses indicate the identifiers given to the m-subsequences.

The shaded tuples of the relation $SNDO_1O_2$ in FIG. 12 are decomposed into the shaded tuples of the relations $SNO_1$ and $SDO_2$ in FIG. 13. It can be learned that the redundancy, i.e., the Cartesian product between $NO_1$ and $DO_2$ shown in FIG. 12 has been eliminated in FIG. 13.

If representing the relations $SNO_1$ and $SDO_2$ in the form of the inverted index, they become identical to the front-end and inverted index and the back-end inverted index, respectively, in FIG. 7.

According to the present invention as described above, the n-gram/2L index structure can reduce the index size and enhance the query performance remarkably, compared with the n-gram index by eliminating the redundancy of the position information that exists in the n-gram index, which will now be analyzed as follows.

First, the index size will be analyzed.

The parameters affecting the size of the n-gram/2L index are the length n of n-grams and length m of m-subsequences. In general, the value of n is determined by applications, whereas, the value of m can be freely tuned for building the n-gram/2L index of the present invention.

Accordingly, description will now be directed to a method for determining the optimal length of m (hereinafter, referred simply to as $m_o$) that minimizes the index size and an analysis of the n-gram/2L index size based on the same.

In Table 1 below, some basic notations to be used for analyzing the size of the n-gram/2L index are defined. Here, the number of the offsets stored in the index is used as the sizes of the n-gram index and the n-gram/2L index.

The reason is because the index sizes are approximately proportional to the number of the offsets representing the occurrences of terms in documents (I. Witten, A. Moffat, and T. Bell, Managing Gigabytes: Compressing and Indexing Documents and Images, Morgan Kaufmann Publishers, Los Altos, Calif., 2nd ed., 1999).

TABLE 1

Notations used for obtaining $m_o$

| Symbols | Definitions |
|---|---|
| $size_{ngram}$ | the size of the n-gram index |
| $size_{front}$ | the size of the front-end inverted index |
| $size_{back}$ | the size of the back-end inverted index |
| S | the set of unique m-subsequences extracted from the set of documents |
| $k_{ngram}(s)$ | the number of the n-grams extracted from an m-subsequence s |
| $k_{doc}(s)$ | the frequency of an m-subsequence s appearing in the set of documents |
| $avg_{ngram}(S)$ | the average value of $k_{ngram}(s)$ wheres $\in$ S $(=(\Sigma_{s \in S} k_{ngram}(s))/|S|)$ |
| $avg_{doc}(S)$ | the average value of $k_{doc}(s)$ wheres $\in$ S $(=(\Sigma_{s \in S} k_{doc}(s))/|S|)$ |

To determine the value of $m_o$, from which the ratio of the decrease in the index size via the decomposition becomes maximum, the decomposition efficiency will now be defined in Definition 4.

Definition 4:

The decomposition efficiency is the ratio of the size of the n-gram/2L index to that of the n-gram index, which can be represented with the notations of Table 1 as follow.

$$\text{decomposition efficiency} = \frac{size_{ngram}}{size_{front} + size_{back}} \quad (1)$$

The decomposition efficiency in Definition 4 is computed through Formulas 1 to 5. Here, the number of offsets in the n-gram index or in the n-gram/2L index is calculated using the relation $SNDO_1O_2$. Since the relation $SNDO_1O_2$ is created by normalizing the n-gram index into the 1NF, the number of offsets is equal to that of tuples.

In the relation $SNDO_1O_2$ representing the n-gram indexes, the number of tuples, of which the value of attribute S is s, is $k_{ngram}(s) \times k_{doc}(s)$, which is because the values of attributes $NO_1$ and $DO_2$ for any value of the attribute S in the relation $SNDO_1O_2$ form a Cartesian product, as illustrated in Lemma 2. Accordingly, the overall size of the n-gram indexes can be calculated as in Formula 2, i.e., the summation of $k_{ngram}(s) \times k_{doc}(s)$ for all m-subsequences.

In the relation $SNO_1$ corresponding to the front-end inverted index, the number of tuples, of which the value of attribute S is s, becomes $k_{ngram}(s)$. Hence, the overall size of the front-end inverted indexes is as in Formula 3, i.e., the summation of $k_{ngram}(s)$ for all m-subsequences.

In the relation $SDO_2$ corresponding to the back-end inverted index, the number of tuples, of which the value of attribute S is s, is $k_{doc}(s)$. Thus, the overall size of the back-end inverted indexes is as in Formula 4, i.e., the summation of $k_{doc}(s)$ for all m-subsequences. Consequently, Formula 5 for the decomposition efficiency is created from Formulas 1 to 4.

$$size_{ngram} = \sum_{s \in S} (k_{ngram}(s) \times k_{doc}(s)) \quad (2)$$

$$size_{front} = \sum_{s \in S} k_{ngram}(s) \quad (3)$$

$$size_{back} = \sum_{s \in S} k_{doc}(s) \quad (4)$$

$$\text{decomposition efficiency} = \frac{\sum_{s \in S} (k_{ngram}(s) \times k_{doc}(s))}{\sum_{s \in S} (k_{ngram}(s) + k_{doc}(s))} \quad (5)$$

$$\approx \frac{|S|(avg_{ngram}(S) \times avg_{doc}(S))}{|S|(avg_{ngram}(S) + avg_{doc}(S))}$$

The decomposition efficiency is computed by obtaining S, $k_{ngram}(s)$, and $k_{doc}(s)$ by preprocessing the document collection. This can be done by sequentially scanning the document collection only once (O(data size)) Like this, to determine $m_o$, the decomposition efficiencies for several candidate values of m are calculated to select the one that has the maximum decomposition efficiency.

As shown in Formula 5, the space complexity of the n-gram index is $O(|S| \times (avg_{ngram} \times avg_{doc}))$, while that of the n-gram/2L index is $O(|S| \times (avg_{ngram} + avg_{doc}))$. The condition that the decomposition efficiency is maximized is when $avg_{ngram}$ is equal to $avg_{doc}$.

Meanwhile, $avg_{doc}$ increases as the database size gets larger, whereas, $avg_{ngram}$ increases as m gets longer. Accordingly, if obtaining $m_o$ by preprocessing given data, $m_o$ tends to become larger as the given data is larger.

That is, if the given data becomes larger, both $avg_{ngram}$ and $avg_{doc}$ increase. Here, since $(avg_{ngram} \times avg_{doc})$ increases more rapidly than $(avg_{ngram} + avg_{doc})$ does, the decomposition efficiency increases as the database size does. Therefore, the n-gram/2L index has a good characteristic that reduces the index size more efficiently in a larger database.

Subsequently, description will now be directed to an analysis of query performance.

The parameters affecting the query performance of the n-gram/2L index are m, n, and the length Len(Q) of the string Q. Thus, a ballpark analysis of the query performance will be carried out hereinafter to investigate the tendency of the query performance of the n-gram/2L index based on such parameters.

For simplicity of the analysis, the following two assumptions are made.

First, suppose that the query processing time is proportional to the number of offsets accessed and the number of posting lists accessed. Since accessing a posting list incurs a seek time for moving the disk head to locate the posting list, the more the number of posting list accessed is, the larger the query processing time required additionally becomes.

Second, assuming that the size of the document collection is so large that all possible combinations of n-grams $(=|\Sigma|^n)$ or m-subsequences $(=|\Sigma|^m)$, wherein $\Sigma$ denotes the alphabet, are indexed in the back-end inverted index (for example, when $|\Sigma|=26$ and m=5, $|\Sigma|^m=11,881,376$). Since the query performance is important especially in a large database, the second assumption is indeed reasonable.

The ratio of the query performance of the n-gram index to that of the n-gram/2L index is computed via Formulas 6 to 9 below.

If the average number of offsets in a posting list is $k_{offset}$ and the number of posting lists accessed during query processing is $k_{plist}$, the number of offsets accessed during query processing is $k_{offset} \times k_{plist}$.

In the n-gram index, since $k_{offset}$ is ($size_{ngram}/|\Sigma|^n$) and $k_{plist}$ is (Len(Q)−n+1), the query processing time of the n-gram index is calculated as in Formula 6.

In the front-end inverted index of the n-gram/2L index, since $k_{offset}$ is ($size_{front}/|\Sigma|_n$) and $k_{plist}$ is (Len(Q)−n+1), the query processing time is as in Formula 7.

In the back-end inverted index of the n-gram/2L index, $k_{offset}$ is ($size_{back}/|\Sigma|^m$) and $k_{plist}$ is the number of m-subsequences covering Q. Here, the number is calculated differently from the cases where Len(Q)<m or Len(Q)≥m.

If Len(Q)≥m, the number of m-subsequences corresponding to $S_{i+1}, \ldots S_{j-1}$ in FIG. 9A is (Len(Q)−m+1), and that of m-subsequences corresponding to $S_i$ or $S_j$ is $$\sum_{i=0}^{m-n-1} |\Sigma|^{m-n-i},$$

respectively. If Len(Q)<m, the number of a m-subsequence corresponding to $S_k$ in FIG. 9B is $((m-Len(Q)+1) \times |\Sigma|^{m-Len(Q)})$, and that of m-subsequences corresponding to $S_p$ or $S_q$ is $$\sum_{i=0}^{Len(Q)-n-1} |\Sigma|^{m-n-i},$$

respectively.

Accordingly, the query processing time in the back-end inverted index is as in Formula 8. Finally, Formula 9 shows the ratio of the query processing times.

$$time_{ngram} = \frac{size_{ngram}}{|\Sigma|^n} \times (Len(Q) - n + 1) \qquad (6)$$

$$time_{front} = \frac{size_{front}}{|\Sigma|^n} \times (Len(Q) - n + 1) \qquad (7)$$

$$time_{back} = \qquad (8)$$

$$\begin{cases} \frac{size_{back}}{|\Sigma|^m} \times \left( Len(Q) - m + 1 + 2 \sum_{i=0}^{m-n-1} |\Sigma|^{m-n-i} \right), & \text{if } Len(Q) \geq m \\ \frac{size_{back}}{|\Sigma|^m} \times \left( \begin{array}{c} (m - Len(Q) + 1) \times |\Sigma|^{m - Len(Q)} + \\ 2 \sum_{i=0}^{Len(Q)-n-1} |\Sigma|^{m-n-i} \end{array} \right), & \text{if } Len(Q) < m \end{cases}$$

$$\frac{time_{ngram}}{time_{front} + time_{back}} = \qquad (9)$$

$$\begin{cases} \frac{size_{ngram} \times (Len(Q) - n + 1)}{(size_{front} \times (Len(Q) - n + 1)) + \left( size_{back} \times \left( \frac{Len(Q) - m + 1}{|\Sigma|^{m-n}} + c \right) \right)}, & \text{if } Len(Q) \geq m \\ \frac{size_{ngram} \times (Len(Q) - n + 1)}{(size_{front} \times (Len(Q) - n + 1)) + \left( size_{back} \times \left( \frac{m - Len(Q) + 1}{|\Sigma|^{Len(Q)-n}} + d \right) \right)}, & \text{if } Len(Q) < m \end{cases}$$

where $$c = 2 \sum_{i=0}^{m-n-1} \left( \frac{1}{|\Sigma|} \right)^i,$$

$$d = 2 \sum_{i=0}^{Len(Q)-n-1} \left( \frac{1}{|\Sigma|} \right)^i$$

It can be learned from Formula 9 that, since $size_{ngram} = |S|$ ($avg_{ngram} \times avg_{doc}$), the time complexity of the n-gram index is O($|S|$ ($avg_{ngram} \times avg_{doc}$)), while that of the n-gram/2L index is O($|S|$ ($avg_{ngram} + avg_{doc}$)).

That is, the time complexities of the n-gram index and the n-gram/2L index are identical to their space complexities. Accordingly, the time complexity indicates that the n-gram/2L index has a good characteristic that the query performance improves compared with the n-gram index, and further, the improvement gets larger as the database size gets larger.

As can be learned from Formulas 6 to 9, the query processing time of the n-gram index increases proportionally to Len(Q). In contrast, the query processing time of the n-gram/2L index hardly increases even though Len(Q) becomes longer.

In the front-end inverted index, the query processing time increases proportionally to Len(Q), but the index size is very small. In the back-end index, Len(Q) little affects the query processing time since $|\Sigma|^{m-n}$ is dominant (e.g., if $|\Sigma|=26$, m=6, and n=3, $|\Sigma|^{m-n}=17,576$).

The reason why the size of the front-end inverted index is smaller is because the index is built for the set of m-subsequences that are much smaller than the document collection (i.e., if the size of the document collection is 1 GBytes and m=5, the size of the set of m-subsequences is 13 to 27 MBytes).

The excellent query performance is very important when Len(Q) becomes longer, since the n-gram index has a drawback in that the query processing time is increasingly required as the length of the query is very long (Hugh E. Williams, "Genomic Information Retrieval," In Proc. the 14th Australasian Database Conferences, 2003).

To analyze the query processing time more precisely, the time required for accessing the posting lists should be considered. Assuming that α is the seek time required for accessing a posting list, the query processing time required additionally is ($k_{plist} \times \alpha$).

Hence, the time plist_time required for accessing the posting lists is calculated by using $k_{plist}$ in Formulas 6 to 8 as shown in Formulas 10 to 12.

$$\text{plist\_time}_{ngram} = \alpha \times (Len(Q) - n + 1) \quad (10)$$

$$\text{plist\_time}_{front} = \alpha \times (Len(Q) - n + 1) \quad (11)$$

$$\text{plist\_time}_{back} = \quad (12)$$

$$\begin{cases} \alpha \times \left( Len(Q) - m + 1 + 2 \sum_{i=0}^{m-n-1} |\sum|^{m-n-i} \right), & \text{if } Len(Q) \geq m \\ \alpha \times \left( \begin{array}{c} (m - Len(Q) + 1) \times |\sum|^{m-Len(Q)} + \\ 2 \sum_{i=0}^{Len(Q)-n-1} |\sum|^{m-n-i} \end{array} \right), & \text{if } Len(Q) < m \end{cases}$$

As can be learned from Formulas 10 and 12, $p_{list\_}\text{time}_{ngram} = p_{list\_}\text{time}_{front}$ and, thus, the time required for accessing the posting lists of the n-gram/2L index is longer plist_time$_{back}$ than that of the n-gram index.

In Formula 12, the dominant factor of $k_{plist}$ is $$\left( 2 \sum_{i=0}^{m-n-1} |\sum|^{m-n-i} \right) \text{ if } Len(Q) \geq$$

$$m \text{ and } \left( 2 \sum_{i=0}^{Len(Q)-n-1} |\sum|^{m-n-i} \right) \text{ if } Len(Q) < m,$$

where these values increase exponentially as m gets larger.

Hence, if $(m_o-1)$ is used instead of $m_o$ for the length of m-subsequences, the query performance can be significantly improved, while causing a light loss in terms of the index size.

Moreover, as a result of experiments for 1 GByte of real text data (TREC-1G) and protein sequence data (PROTEIN-1G) in accordance with the present invention, the n-gram/2L index has the size reduced by up to 1.9 (PROTEIN-1G, m=4) to 2.7 (PROTEIN-1G, m=5) times when using $(m_o-1)$ as the length of m-subsequences and, at the same time, enhances the query performance for queries having the lengths in the range of 3 to 18 by up to 13.1 (PROTEIN-1G, m=4) times, compared with those of the n-gram index.

As described above in detail, the present invention can reduce the index size and enhance the query performance, compared with those of n-gram index, by eliminating the redundancy of the position information caused by a non-trivial multivalued dependency (MVD) existing in the n-gram index.

Moreover, the n-gram/2L index of the present invention is more advantageous than the n-gram index as much as the size of database to be accessed is larger in terms of the index size. That is, the relative size of the n-gram/2L index to the existing n-gram index gets smaller as the database size becomes larger.

In addition, the n-gram/2L index of the present invention is more advantageous than the n-gram index as much as the size of database to be accessed is larger in terms of the query performance. That is, the relative size of the n-gram/2L index to the existing n-gram index gets smaller as the database size becomes better.

Furthermore, the query processing time of the n-gram/2L index scarcely increases even through the length of the query string becomes longer.

As described in detail above, the present invention has been disclosed herein with reference to preferred embodiments; however, it will be understood by those of ordinary skill in the art that various changes in form and details may be made without departing from the spirit and scope of the present invention as set forth in the following claims.

What is claimed is:

1. A computer-implemented method of deriving a two-level n-gram inverted index in an index system, in a computer-implemented method of deriving an inverted index comprising a front-end inverted index and a back-end inverted index from an n-gram inverted index, the computer-implemented method comprising:

converting the n-gram inverted index into a $SNDO_1O_2$ relation that obeys a first normal form (1NF),
wherein, $SNDO_1O_2$ relation has (m-subsequence, n-gram, document ID, offset of ngram on m-subsequence, offset of m-subsequence on document) schema;
identifying whether or not a redundancy of position information, caused by a non-trivial multivalued dependency (MVD), exists in the $SNDO_1O_2$ relation obtained in the first step;
decomposing the $SNDO_1O_2$ relation into $SNO_1$ relation and $SDO_2$ relation to obey a fourth normal form (4NF) in order to eliminate the redundancy; and
converting the $SNO_1$ relation into the front-end inverted index of an inverted index database on a server and the $SDO_2$ relation into the back-end inverted index of the inverted index database on the server.

* * * * *